United States Patent [19]

Kawaguchi

[11] Patent Number: 4,511,167
[45] Date of Patent: Apr. 16, 1985

[54] DETACHABLE HOLDER FOR CONTAINERS

[75] Inventor: Takehiko Kawaguchi, Sakai, Japan

[73] Assignee: Taiyo Sanso Kabushiki Kaisha, Osaka, Japan

[21] Appl. No.: 515,901

[22] Filed: Jul. 21, 1983

[30] Foreign Application Priority Data

Mar. 25, 1983 [JP] Japan .............................. 58-43769[U]
Apr. 4, 1983 [JP] Japan .............................. 58-50404[U]

[51] Int. Cl.³ ........................ A47J 45/10; B65D 23/10
[52] U.S. Cl. ..................................... 294/28; 294/31.2
[58] Field of Search ..................... 294/27 R, 27 H, 28, 294/29, 31 R, 31 A, 31.2, 32, 33, 137, 165; 16/114 R; 215/100 A; 248/145.6, 311.2

[56] References Cited

U.S. PATENT DOCUMENTS

| 679,742 | 8/1901 | Goddard | 294/31.2 |
| 2,063,805 | 12/1936 | Goetting | 294/28 |
| 2,610,081 | 9/1952 | Bushman | 294/28 |
| 2,807,399 | 9/1957 | Burns | 294/32 |
| 3,021,026 | 2/1962 | Clare | 294/27 R X |

FOREIGN PATENT DOCUMENTS 56-22744 5/1981 Japan .
58-8099 2/1983 Japan .
707009 4/1954 United Kingdom ............ 294/27 H Primary Examiner—Johnny D. Cherry
Attorney, Agent, or Firm—Armstrong, Nikaido, Marmelstein & Kubovcik

[57] ABSTRACT

A detachable holder for containers such as vacuum bottles, ordinary bottles, and cans being composed of:
  a first pair of bent arms having respective ends connected to each other via a hinge;
  a second pair of bent arms having respective ends connected to each other via a hinge;
  two handle-levers for connecting free ends of the first pair of arms with those of the second pair of arms; and,
  a fixing member engageable with the above handle-levers; wherein fixing handle-levers for clamping the container by the holder and detachment of the holder from the container may be easily achieved by sliding the above fixing member on the above handle-levers.

5 Claims, 16 Drawing Figures

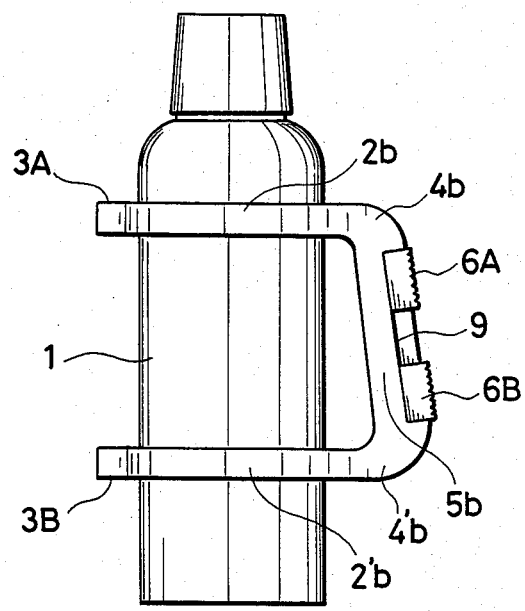
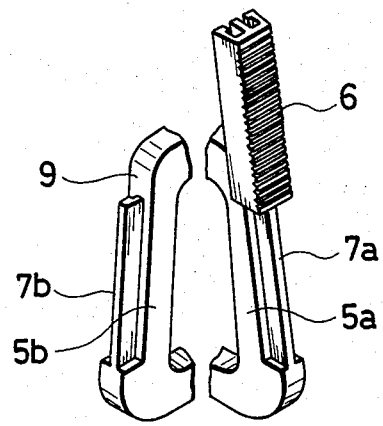
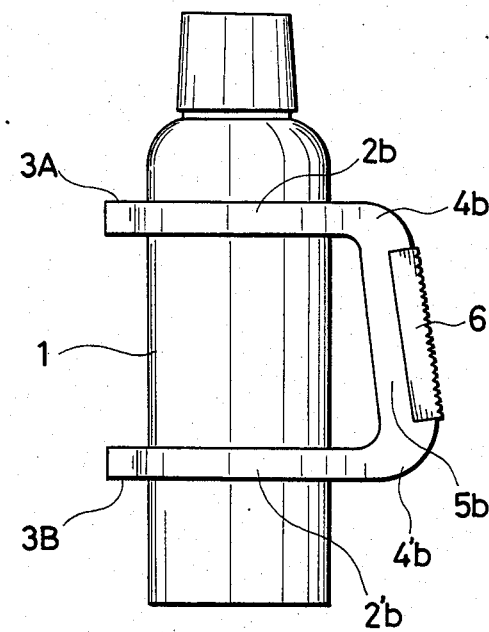

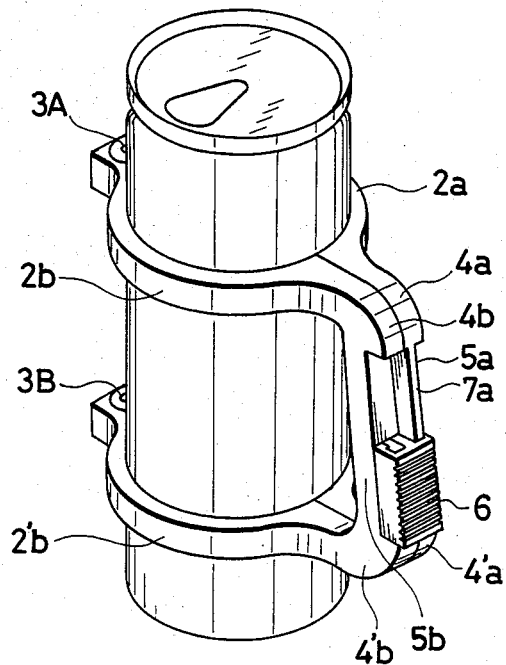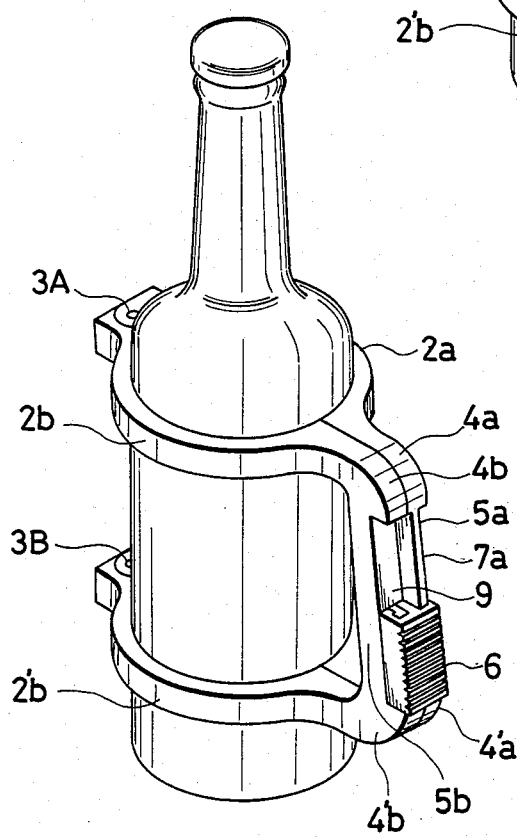

DETACHABLE HOLDER FOR CONTAINERS

BACKGROUND OF THE INVENTION

This invention relates to a detachable holder for containers such as vacuum bottles, ordinary bottles, or cans.

Generally, commercial vacuum bottles are either table-stand type and portable type. Additionally a combined type for table-stand use and portable use too has been developed. Known conventional combined type vacuum bottles are provided with a handle and a shoulder strap (e.g., as disclosed in Japanese Utility Model Publication No. 8099/1983) or provided with a suspender string usable also as a handle (e.g., as disclosed in Japanese Utility Model Publication No. 22744/1981).

In these bottles, the parts necessary for carrying are trouble some and obstructive when present on a table-stand type. Similarly, the parts for table-standing are troublesome and obstructive when present on a portable type. The presence of obstructive parts spoils the beauty, overall style, and appearance of the vacuum bottles.

Bottles and cans are widely used as containers for drinks, seasonings, edible oils, medicines, agricultural chemicals, industrial chemicals, or extinguisher agents. Some of these bottles and cans are provided with a handle but others used as disposables are not provided with a handle in the ordinary case because provision of the handle requires an extra space and causes an increase in production cost.

However, in the case of a large bottle such as one capable of containing 1.8 liter, the provision of a sturdy handle makes it easy to carry the bottle stably or to pour the liquid from the bottle into other small vessels such as small bottles, cups, or glasses.

The contents of a bottle or a can, when emptied therefrom, may possibly run over the mouth of the container and stick on the outer surface of these containers. Direct touch of a user's hand with such contents is often undesirable. Even in such cases, if the bottle or can is readily provided with a handle, undesirable sticking of harmful or irritating substance on a user's hand may be kept out.

Gripping a bottle or can containing cold drinks with a naked hand causes undesirable warming of cold drinks. Additionally, the hand is cooled too much to hold the bottle or can for a long time. In such a case, the provision of a handle on the bottle or can is desired.

In this circumstance, the provision of a handle to bottles or cans is frequently convenient and desirable, but most bottles and cans do not have handles because of the complicated process for the production of such containers, the consequent heavy expenditure on production cost, the need for additional space for housing the containers, the increase in cost of transportion, and the increased chance of damage due to the handle, as above mentioned.

An object of this invention is to provide a detachable holder suitable for holding a vacuum bottle, an ordinary bottle, or a can.

Another object of this invention is to provide a holder which permits easy carrying of a vacuum bottle, an ordinary bottle, or a can and easy pouring of the contents of the containers into other vessels.

Still another object of this invention is to provide a detachable holder for containers which is endowed with beauty of simpleness and functionalism.

These and other objects of this invention will become apparent in the following detailed descriptions.

SUMMARY OF THE INVENTION

It has now been found that the above-mentioned problems may be solved and the objects of this invention may be attained by providing a new detachable holder for containers comprising: p1 the first pair of bent arms where respective ends of them are connected each other via a hinge;

the second pair of bent arms where respective ends of them are connected each other via a hinge; two handle-levers connecting free ends of said 1st pair of arms with those of said 2nd pair of arms; and, at least one fixing member engageable with said handle-levers;

the holder wherein:

said handle-levers are capable of being brought into contact each other or detached by closing or opening of said arms via said hinges;

said arms are capable of being clamped on or released from the container in response to closing or opening of said hinges, respectively;

said two handle-levers have respectively a rail or groove for engaging with said fixing member in their lengthwise direction, and, on the other hand, said fixing member has grooves or rails to be engaged with rails or grooves on said handle-levers in the lengthwise direction of the member;

at least one of said rails on the handle-levers or fixing member has a cutaway part; and, fixation for joining said two handle-levers and concurrent clamping the container with said arms or separation of said two handle-levers and concurrent detachment of said arms from the container is carried out by sliding said fixing member on said handle-levers.

BRIEF DESCRIPTION OF THE DRAWINGS

FIG. 9 is a front view of another example of holder according to this invention fixed to the vacuum bottle.

FIG. 10 is a front view of still another example of holder according to this invention fixed to the vacuum bottle; and FIG. 11 is a partial perspective view showing the state of engagement between the handle-levers and the fixing member of the holder shown in FIG. 10.

FIG. 15 is a perspective view of the holder according to this invention fixed to a bottle.

FIG. 16 is a perspective view of the holder according to this invention fixed to a can.

DETAILED DESCRIPTION OF THE INVENTION

Figure 1:
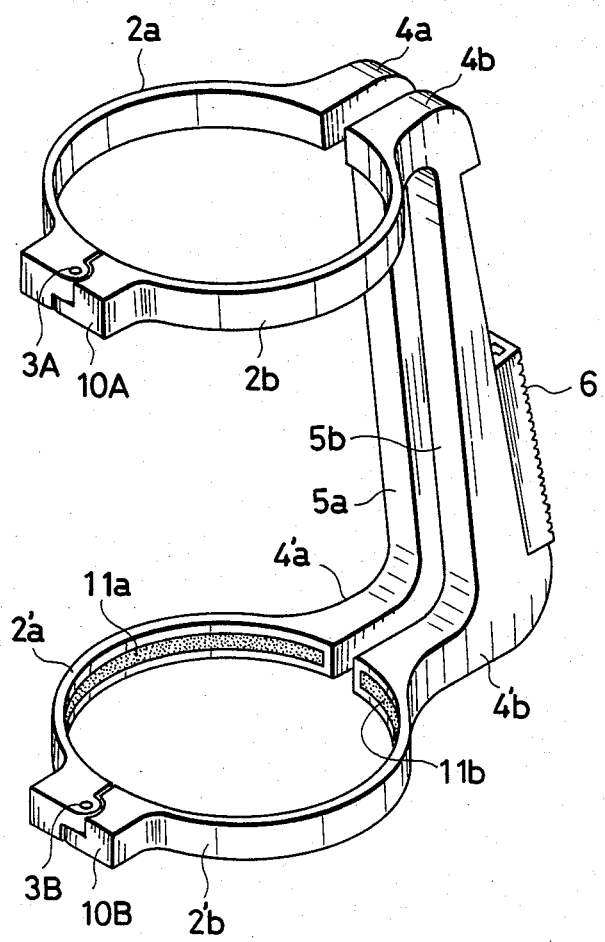
FIG. 1 is a perspective view of an example of a holder according to this invention.

While this invention is susceptible of being embodied in many different forms, preferred embodiment of the invention are shown in the drawings and described in detail hereinbelow with the understanding that the present disclosure is to be considered to exemplify of the principles of the invention and is not intended to limit the invention to the embodiments illustrated.

Figure 4:
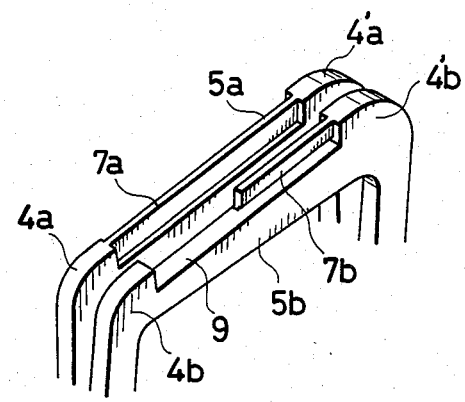
FIG. 4 is a partial perspective view of the handle-levers of the holder shown in FIG. 1.
Figure 5:
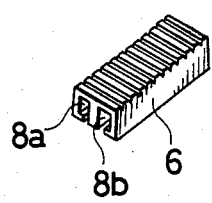
FIG. 5 is a perspective view of a fixing member of the holder shown in FIG. 1.
Figure 2:
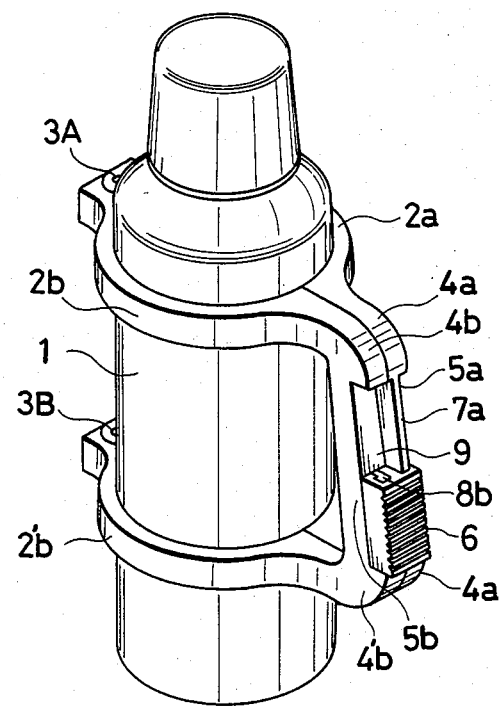
FIGS. 2 and 3 are respectively a perspective view and a front view of the holder shown in FIG. 1 fixed to the vacuum bottle.
Figure 6:
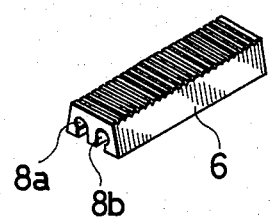
FIGS. 6, 7, and 8 are perspective views of fixing members in other examples of the holder according to this invention.
Figure 7:
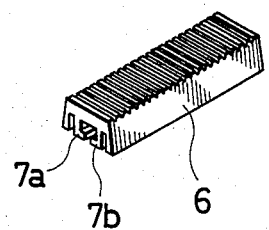
Figure 3:
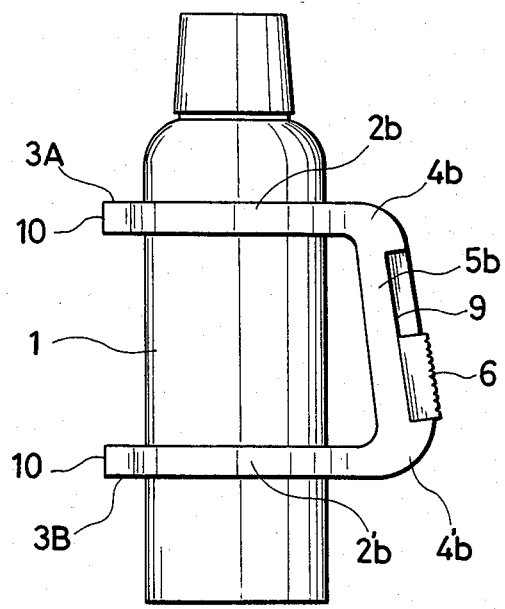
Figure 8:
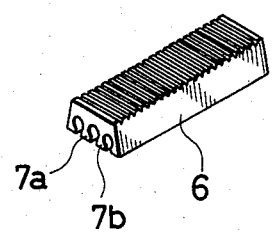

The embodiments of this invention will be described in detail with reference to the drawings as follows:

FIG. 1 is a perspective view showing an example of a holder according to this invention. The holder is composed of a first pair of arms 2a and 2b, a second pair of arms 2'a and 2'b, a pair of hinges 3A and 3B, a pair of handle-levers 5a and 5b, and a fixing member 6. FIGS. 2 and 3 are a perspective view and a front view, respectively, showing the holder shown in FIG. 1 fixed to the vacuum bottle. FIGS. 4 and 5 are perspective views showing handle-levers 5a and 5b of the holder shown in FIG. 1 and a fixing member 6 of the holder shown in FIG. 1, respectively.

In the drawings, the reference numeral 1 indicates the body of the vacuum bottle. Numerals 2a and 2b denote bent arms in a pair for clamping the body 1 of the vacuum bottle, one end of each of the respective two arms 2a and 2b being connected to each other via the hinge 3A. Numerals 2'a and 2'b indicate other bent arms in a pair for clamping the body 1 of the vacuum bottle, one end of each of the respective two arms 2'a and 2'b being connected to each other via the hinge 3B in the similar way as that for said arms 2a and 2b. The handle-levers 5a and 5b connect by joining the free end 4a of the arm 2a with that 4'a of the arm 2'a and the free end 4b of the arm 2b with that 4'b of the arm 2b, respectively. These two handle-levers 5a and 5b are provided with rails 7a and 7b in the lengthwise direction thereof, respectively, and kept in engagement with a fixing member 6 provided with grooves 8a and 8b.

The handle-lever 5a is provided with a rail 7a throughout the path along which the fixing member 6 engaged with said rail 7a slides, whereas the other handle lever 5b is provided with a rail 7b which, however, extends over only the lower half of the path along which the fixing member 6 slides and not over the upper half of the path which is formed into a cutaway part 9. Therefore, when the fixing member 6 is raised up to the top along the handle-levers 5a and 5b, the groove 8a, fitted onto the rail 7a of the handle lever 5a remains engaged with the rail but the other groove 8b fitted onto the rail 7b of the handle-lever 5b moves to a position out of engagement with the rail 7b; and so the fixing member 6 is released from the handle-lever 5b and arms 2a, 2b, 2'a, and 2'b may be released from the body 1 of the vacuum bottle with the rotation of hinges 3A and 3B. In contrast, fitting of the holder onto the body 1 of the vacuum bottle is performed in such manner that the holder is brought close to the body 1 of the vacuum bottle while the arms 2a, 2b, 2'a, and 2'b are open, then all of these arms are closed, and the fixing member 6 that has been raised is downwardly moved so that the rails 7a and 7b of the handle-levers 5a and 5b are brought into engagement with the grooves 8a and 8b of the fixing member 6. In this way, the holder may be fitted onto the vacuum bottle with the arms 2a, 2b, 2'a, and 2'b adapted to clamp the body 1 of the bottle.

The vacuum bottle may be laid on its side conveniently thanks to flat surfaces 10A and 10B serving as stable stands provided on the arm ends to which hinges 3A and 3B are secured. However, such stand surfaces are not always needed for this invention and the surface of hingefixing edge is not necessarily flat but may be curved.

Numerals 11a and 11b in FIG. 1 denote non-slip finishing parts mounted on the inner sides of the arms 2'a and 2'b. These non-slip parts serve to help clamping of the body 1 of the vacuum bottle with the arms 2'a and 2'b but are not always needed, too, for this invention. Non-slip finishing may be given by providing a more frictionally rough surface over the inner side of the arm, or providing projections and recesses engageable each other or rough surface over both the outer side of the body 1 of the vacuum bottle and the inner side of the arm. Providing synthetic resin tape or elastomer tape having a rough surface for an increase in frictional power adhered to the inner surface of the arm is a simple and easy method. A setting touch-close type of fastener may be adhered to the surface of the body 1 of the vacuum bottle and the inner surface of the arm.

While, in the above embodiment, rails 7a and 7b are set on the sides of handle-levers 5a and 5b and grooves 8a and 8b on the side of the fixing member 6 respectively, setting grooves 8a and 8b on the sides of handle-levers 5a and 5b and rails 7a and 7b on the side of the fixing member 6 respectively may also fulfil the purpose; furthermore, a rail and a groove on each of handle-levers 5a and 5b as well as a groove and a rail on the fixing member may be allowed.

Shape or form of groove or rail on the fixing member 6 may be optionally modified, for example, as shown as in FIGS. 5, 6, 7, or 8. The shape may be chosen appropriately so as to obtain satisfactory sliding and stability in fixing as well as to fulfil requirements for strength, durability, and workability.

Rails 7a and 7b to be set on the handle-levers 5a and 5b or on the fixing member 6 may be tapered slightly and suitably in consideration of stability in fixing.

For convenience in description, in an example shown in from FIG. 1 through FIG. 4, the fixing member 6 slidably mounted on the handle-levers 5a and 5b has a length about half of the whole length of rail set on the handle-levers, and fixing is given on the location of the fixing member 6 at the bottom position on the rails 7a and 7b set on the handle-levers 5a and 5b. Position of the fixing member 6 for fixing the holder to the vacuum bottle is not limited to the above location in the example and may be modified, if necessary. For example, two fixing members 6A and 6B may be used so as to be fixed to or removed from the handle-levers 5a and 5b at the central portion of the above levers as shown in FIG. 9. In this example one of fixing member 6A and the other fixing member 6B are arranged to be slid at the upper and the lower portions of the handle-levers 5a and 5b respectively on fixing. In an example shown in FIGS. 10 and 11, a handle-lever 5a is provided with a rail 7a almost throughout the entire length of the lever 5a so as to prevent the fixing member 6 from being detached from the rail 7a. The other lever 5b is provided with a cutaway part 9 so as to make the fixing member 6 detach from the rail 7b. Thus, the holder may be fixed in the state where the fixing member 6 extends over almost the entire length of the handle-levers 5a and 5b.

As a modification of example shown in FIGS. 10 and 11, following designs are given: two small projections may be made on the lower end of the fixing member 6 and on the upper part of the handle-lever 5a so as to prevent the fixing member 6 from sliding above the position where both the two small projections meet; and fixing or detaching the fixing member 6 to or from the handle-lever 5b may be allowed at the position.

Both handle-levers 5a and 5b may be individually provided with rails 7a and 7b extending to the upper parts of the levers and having respectively a cutaway part 9 at their uppermost ends so that said levers are opened or closed while the fixing member 6 is moved upward to be completely out of engagement with the handle-levers, and then are fixed after the fixing member 6 is fitted onto the levers. Cutaway part 9 for fitting or detaching the fixing member 6 to and from the holder may be set optionally at higher position or lower position. Some contrivance on the edge portion of the fixing member 6 may be given in order to put the rail or groove out of sight or a modification may be given on two handle-levers 5a and 5b to overlap each other in order to put the gap between the two levers 5a and 5b out of sight.

A large number of parallelly running indent lines may be set over the surface of fixing member in order to prevent slippage of a user's hand on grasping the holder as shown in the drawing. Any other contrivances such as check, zigzag, or other patterned rough surface, satin surface, or smooth surface may be employed optionally by those who are skilled in the art, if required.

An angle of the holder to the body 1 of the vacuum bottle may be designed also optionally, if required. Further, application of various designs or patterns and attachment of accessories to the holder are optional as far as the function of the holder is not impeded.

Figure 12:
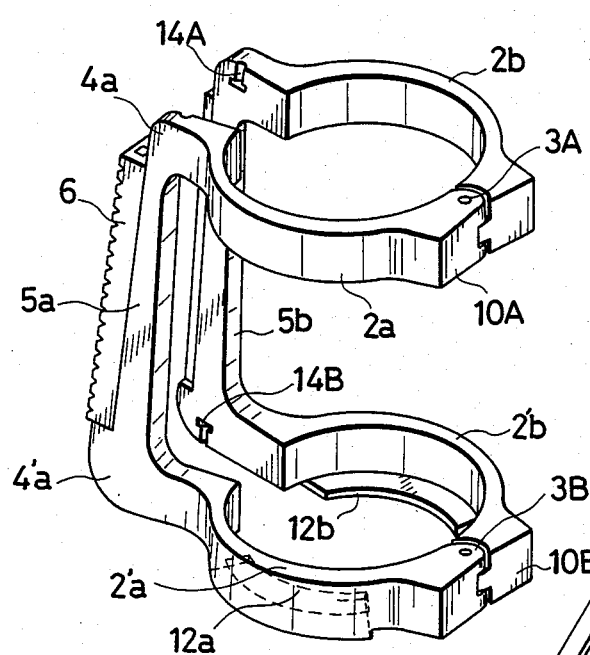
FIG. 12 is a perspective view of a further example of holder according to this invention.
Figure 13:
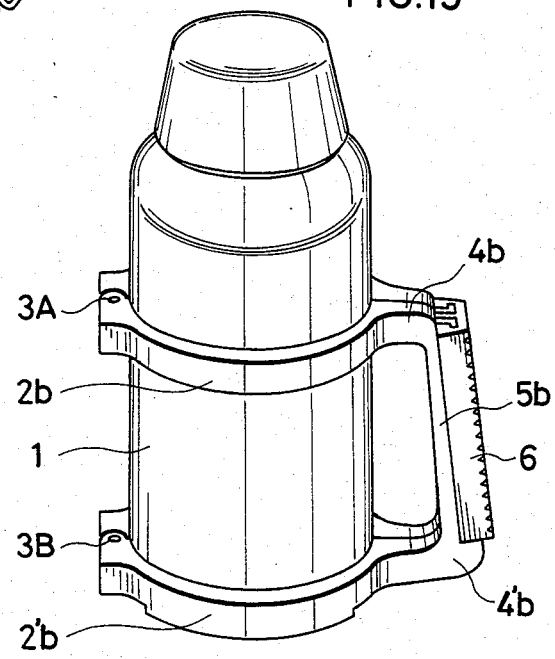
FIG. 13 is a sketch of the holder shown in FIG. 12 fixed to the vacuum bottle.

FIG. 12 shows a holder having steps 12a and 12b extending inwardly the bottom of the pair of lower arms 2'a and 2'b. When the vacuum bottle is mounted on these steps 12a and 12b and the holder is fixed thereto, more stability and reliability of the holder fixed on the vacuum bottle are obtained. FIG. 13 is a sketch of the holder provided with steps, fixed to the vacuum bottle. These steps 12a and 12b may be provided with supporter means so as to extend inwardly from a position lower than the arms 1'a and 2'b. These steps may be provided in the embodiment of this invention, if required, but are not always needed.

Figure 14:
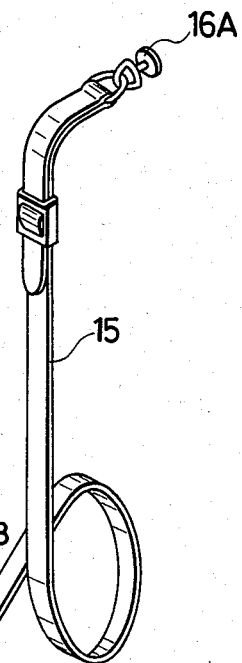
FIG. 14 is a perspective view of a suspender strap to be fixed to the holder shown in FIG. 12 when required.

A detachable holder according to this invention may be applied in various modifications and versatility on use. For example, the holder fixed on a vacuum bottle may be exchanged with auxiliary ones of other colours or shapes or the holder may be replaced with a strap for carrying. If required, a suspender strap 15 shown in a perspective view in FIG. 14 may be attached to the holder of this invention for the convenience of carrying. If necessary, strap-retaining holes 14A and 14B to be fitted around strap retainer members 16A and 16B fixed on both ends of suspender strap 15 may be set up in certain positions on the holder. For example, as shown in FIG. 12, strap retainer members 16A and 16B are fitted into the holes 14A and 14B to fix the strap 15. In this way, a vacuum bottle may be held by the holder and may be carried by suspending the strap 15 on a user's shoulder, if required.

In FIG. 12, strap-retaining holes 14A and 14B are set up on the top of upper arms 2a and 2b and to the bottom of lower arms 2'a and 2'b. The strap 15 is fixed to the arms via the strap retainer members and strap-retaining holes. Alternately the suspender strap 15 may be fixed to a halfway position of the upper arms 2a and 2b or to a halfway position of the upper arm 2a (or 2b) and to a halfway position of the lower arm 2'a (or 2'b) by means of some suitable fixing parts. Attachment of the suspender strap 15 to the holder on necessity may be included in embodiments within the scope of this invention.

As the material of a holder according to this invention, and suitable material may be used permitting the function of the holder as described above. For example, metal, wood, various kinds of polymer substances, and various composite materials may be used depending upon the purpose. Material of the holder in this invention should be chosen generally in consideration and evaluation with overall the nature of material of objective article, strength and toughness, appearance, reliability, workability, cost, and so on. Variety of materials having excellent strength, toughness, and lightness have been developed recently such as various kinds of engineering plastics, FRP (fibre-reinforced plastics), FRM (fibre-reinforced metal composite), or CC composite (carbon fibre-reinforced carbon composite), etc. Selection of material is optional over variety of materals for the production of holder having excellent performance. The reinforced plywood and the like may be also used. Any of known arts in the related fields of technology, for example, monoblock casting, welding, or polishing may be applicable optionally and appropriately to molding, connection or joining, or surface finishing of these materials or products therefrom.

Although a vacuum bottle to which a holder of this invention is fixed may be conventional type of one having double walls made of glass for vacuum space formation and thermal insulation, and enclosed by an outer case, a holder of this invention may be suitably applied also to metallic vacuum bottles of such kinds as made of stainless steel, cupro-nickel, or other metallic materials which are now popular because of their strength and resistance to damage as well as of modern sense exhibited thereby.

Though the most common shape of the body 1 of vacuum bottle has circular cross section like a cylinder or spindle, holders of this invention may be applied to not only those vacuum bottles having circular cross-section but also to those having modified shape such as elliptic, semi-circular-semi-square, or polygonal cross section as far as arms thereof fit the outer periphery of the bottle, permit the holder to be fixed to the body 1 of vacuum bottle at least without play, not to say strictly tightly, and may be easily opened or closed.

A holder of this invention is not only applicable to a vacuum bottle, but also suitably used for holding a bottle or can containing various kinds of drinks such as alcoholic drinks, fruit juice, lactic acid beverage, soft drinks, and coffee; seasonings such as soy sauce, stock, and vinegar; cooking vegetable oils as frying oil and salad oil; medicines and other chemical agents such as sterilizer, insecticides, agricultural chemicals, general commodity chemicals, and reagents for biological research and technology; fire extinguisher; and other liquid, solid, or pasty substances. Bottles and cans made of plastics, ceramics, or the like, to say nothing of glass and metal, may be held by this holder without any limit on the kind of material. The shape of bottle or can may be also optional, for example, cylindrical, elliptical, semi-circular, semi square, or polygonal in cross section.

FIGS. 15 and 16 are perspective views showing a holder according to this invention fixed to a bottle and a can, respectively.

According to this invention, the vacuum bottle may be used in a wide range of application by employing a holder of simple structure as described above and by changing quickly the style of the vacuum bottle between the carrying type and the table-stand one, and the commercial value of the vacuum bottle is enhanced and worth of this invention on practice is very high.

Thanks to simple structure of the holder as above, ordinary bottles and cans may be used as those provided with the holder, thereby providing significant convenience and requiring no extra space since the holder is detachable in the case of storing or conveyance. It is not necessary to fix holders to all of the respective bottles or cans and yet a certain kind of holder may be fixed to bottles or cans of the same kind by detaching after each application, thereby saving expenses. When a holder of this invention is fixed to bottles or cans containing cold or hot drinks, these bottles or cans are made easy to carry and may be handled without direct touch of a user's hands to the cold or hot bottles or cans. When excellent looks and high sense of holders are equipped to bottles or cans from which drinks are directly drunk, the drinker may have the same feeling as that given while drinking using a glass or cup. Applicability of the holder is wide in range including the use for pouring wine or beer into the glass etc. or pouring Japanese "sake" into little sake bottles, or attachment of the holder to the bottle containing oil or soy. The holder is convenient for handling bottles or cans containing such substances as dangerous to human skin, applicable to a small fire extinguisher, thereby providing a highly significant practical value.

What is claimed is:

1. A detachable holder for containers which comprises:

a first pair of bent arms having respective ends connected to each other via a hinge;

a second pair of bent arms having respective ends connected to each other via a second hinge;

two handle-levers connecting free ends of said first pair of arms with those of said second pair of arms; and, at least one fixing member engageable with said handle-levers;

the holder wherein:

said handle-levers are capable of being brought into contact with each other or detached by closing or opening of said arms via said hinges;

said arms are capable of being clamped on or released from the container in response to closing or opening of said hinges, respectively;

said two handle-levers each having respectively a rail for engaging with said fixing member in their lengthwise direction, and, said fixing member has grooves to be engaged with said rails on said handle-levers in the lengthwise direction of the member;

at least one of said rails on the handle-levers has a cutaway part; and fixation for joining said two handle-levers and concurrent clamping the container with said arms or separation of said two handle-levers and concurrent detachment of said arms from the container is carried out by sliding said fixing member on said handle-levers.

2. A detachable holder for containers as set forth in claim 1, wherein arm ends provided with hinges are formed flat so as to serve as stand surfaces.

3. A detachable holder for containers as set forth in claim 1, wherein finish for non-slip is applied to the inner sides of arms.

4. A detachable holder for containers as set forth in claim 1, wherein steps are set to a pair of arms at the bottom position for supporting the container.

5. A detachable holder for containers as set forth in claim 1, further comprising means for retaining a strap provided to the holder at appropriate positions.

* * * * *